(12) United States Patent
Zhuang et al.

(10) Patent No.: US 12,515,211 B2
(45) Date of Patent: Jan. 6, 2026

(54) AZULENE-BASED BRANCHED POLY ARYL-PIPERIDINE ANION EXCHANGE MEMBRANES AND PREPARATION METHODS THEREOF

(71) Applicant: SHANGHAI JIAO TONG UNIVERSITY, Shanghai (CN)

(72) Inventors: Xiaodong Zhuang, Shanghai (CN); Ziyu Fang, Shanghai (CN); Changchun Ke, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 19/211,185

(22) Filed: May 18, 2025

(65) Prior Publication Data

US 2025/0352994 A1   Nov. 20, 2025

(30) Foreign Application Priority Data

May 17, 2024   (CN) .......................... 202410616184.8

(51) Int. Cl.
| | | |
|---|---|---|
| *B01J 41/13* | (2017.01) | |
| *B01J 47/12* | (2017.01) | |
| *C08G 61/12* | (2006.01) | |
| *H01M 8/103* | (2016.01) | |

(52) U.S. Cl.
CPC ............... *B01J 41/13* (2017.01); *B01J 47/12* (2013.01); *C08G 61/122* (2013.01); *C08G 2261/132* (2013.01); *C08G 2261/314* (2013.01); *C08G 2261/334* (2013.01); *H01M 8/103* (2013.01)

(58) Field of Classification Search
CPC .......... B01J 41/12; B01J 41/14; H01M 8/103; C08G 61/122; C08G 2261/314; C08G 2261/334
See application file for complete search history.

(56) References Cited

U.S. PATENT DOCUMENTS

| | | | |
|---|---|---|---|
| 2002/0151662 A1 | 10/2002 | Campbell et al. | |
| 2023/0102700 A1* | 3/2023 | Ba ........................ | H01M 8/1004 429/480 |
| 2024/0363879 A1* | 10/2024 | Lee ........................ | C08G 61/02 |

FOREIGN PATENT DOCUMENTS

| | | | | |
|---|---|---|---|---|
| CA | 3019209 | A1 | 10/2017 | |
| CN | 109705343 | A | 5/2019 | |
| CN | 115466422 | A | 12/2022 | |
| JP | 2002249472 | A | 9/2002 | |
| KR | 20220061829 | A | 5/2022 | |
| WO | WO-2024014848 | A1 * | 1/2024 | ............. C08G 61/12 |

OTHER PUBLICATIONS

Machine Translation of WO2024/014848 A1. Jan. 18, 2024 (Year: 2024).*
Zhang Q et al. Molecular-Potential and Redox Coregulated Cathodic Electrosynthesis toward Ionic Azulene-Based Thin Films for Organic Memristors. ACS Appl. Mater. Interfaces 2024, 16, 22217-22228. Apr. 19, 2024. (Year: 2024).*
Notification to Grant Patent Right for Invention in Chinese Application No. 202410616184.8 mailed on Oct. 18, 2024, 5 pages.
Lin, Chenxiao et al., Preparation of piperidinium-functionalized side-chain-type anion exchange membranes, Membrane Science and Technology, 38(3): 1-8, 2018.

(Continued)

*Primary Examiner* — Stephen E Rieth
(74) *Attorney, Agent, or Firm* — PORUS IP LLC

(57) ABSTRACT

An azulene-based branched poly aryl-piperidine anion exchange membrane and a preparation method thereof are provided. The exchange membrane includes an azulene-based branched poly aryl-piperidine polymer with a following structure:

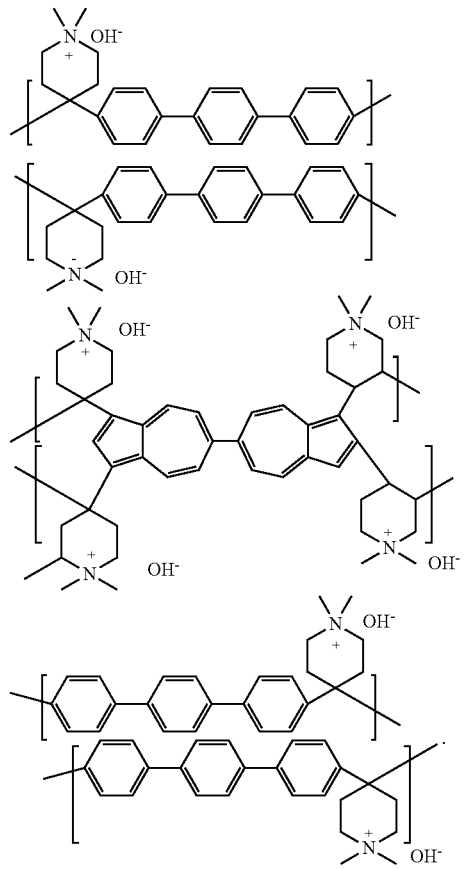

The preparation method includes: preparing an azulene-based branched poly aryl-piperidine precursor; preparing a cationic azulene-based branched poly aryl-piperidine; preparing the azulene-based branched poly aryl-piperidine anion exchange membrane.

5 Claims, 5 Drawing Sheets

(56) References Cited

OTHER PUBLICATIONS

Liu, Xundao et al., Research on the Anion Exchange Membranes for Fuel Cells, Organo—Fluorine Industry, 2, 2018, 10 pages.
Zhuang, Xiaodong et al., Organic Nanoscale Functional Materials Formed by Self-Assembly, Progress in Chemistry, 19(11): 1653-1661, 2007.
Dan N. Pham et al., Novel multimodal cation-exchange membrane for the purification of a single-chain variable fragment from Pichia pastoris supernatant, Journal of Chromatography, 1718(2024): 464-472, 2024.

* cited by examiner

AZULENE-BASED BRANCHED POLY ARYL-PIPERIDINE ANION EXCHANGE MEMBRANES AND PREPARATION METHODS THEREOF

CROSS-REFERENCE TO RELATED APPLICATIONS

This application claims priority of Chinese Patent Application No. 202410616184.8, filed on May 17, 2024, the entire contents of which are incorporated herein by reference.

TECHNICAL FIELD

The present disclosure generally relates to the field of membrane technology, and specifically to an azulene-based branched poly aryl-piperidine anion exchange membrane and a preparation method thereof.

BACKGROUND

Due to global development and population growth, worldwide energy demand continues to increase rapidly. Among the many sources of energy, hydrogen energy is favored for its clean and efficient properties. In the industrialized development and application of hydrogen energy, an anion exchange membrane fuel cell and alkaline electrolytic water technology are able to use low alkaline electrolyte and non-precious metal catalysts, which makes the operating cost greatly reduced and has attracted widespread attention.

An anion exchange membrane (AEM), as a key component of the anion exchange membrane fuel cell and an alkaline electrolytic cell, is facing some technical difficulties, such as the balance between ionic conductivity and dimensional stability of the membrane, the problem of reduced membrane performance and reduced service life under hot alkaline conditions, etc.

Therefore, it is desired to provide an azulene-based branched poly aryl-piperidine anion exchange membrane and a preparation method thereof, such that the anion exchange membrane have an excellent electrical conductivity, excellent mechanical properties, excellent alkali stability, and a long service life.

SUMMARY

One or more embodiments of the present disclosure provides an azulene-based branched poly aryl-piperidine anion exchange membrane. The exchange membrane comprises an azulene-based branched poly aryl-piperidine polymer with a following structure:

One or more embodiments of the present disclosure provides a preparation method of an azulene-based branched poly aryl-piperidine anion exchange membrane. The exchange membrane comprises the azulene-based branched poly aryl-piperidine polymer described above, and the preparation method comprises: (a) preparing an azulene-based branched poly aryl-piperidine precursor, including: dissolving p-terphenyl, 6,6'-biazulenyl, and N-methyl-4-piperidone in dichloromethane, followed by adding trifluoroacetic acid and trifluoromethanesulfonic acid for reacting, and collecting the azulene-based branched poly aryl-piperidine precursor; (b) preparing a cationic azulene-based branched poly aryl-piperidine, including: dissolving the azulene-based branched poly aryl-piperidine precursor in dimethyl sulfoxide (DMSO), adding potassium carbonate and iodomethane for conducting a light avoidance reaction, followed by adding ethyl acetate for purifying, and collecting the cationic azulene-based branched poly aryl-piperidine; (c) preparing the azulene-based branched poly aryl-piperidine anion exchange membrane, including: dissolving the cationic azulene-based branched poly aryl-piperidine in DMSO, collecting a $Cl^-$-type membrane, performing an ion exchange on the $Cl^-$-type membrane to obtain an $OH^-$-type membrane, purifying the $OH^-$-type membrane, and collecting the azulene-based branched poly aryl-piperidine anion exchange membrane.

One or more embodiments of the present disclosure provides an alkaline fuel cell and an alkaline electrolytic cell. The alkaline fuel cell and the alkaline electrolytic cell comprises the azulene-based branched poly aryl-piperidine anion exchange membrane described above, wherein the exchange membrane includes the azulene-based branched poly aryl-piperidine polymer described above, and the exchange membrane is obtained by the preparation process described above.

In some embodiments, an $OH^-$ conductivity of an azulene-based branched poly(p-terphenyl)-piperidine anion exchange membrane is at least 150 mS/cm at 80° C.

BRIEF DESCRIPTION OF THE DRAWINGS

The present disclosure is further described in terms of exemplary embodiments, these exemplary embodiments are described in detail with reference to the drawings. These embodiments are non-limiting exemplary embodiments, in which like reference numerals represent similar structures throughout the several views of the drawings, wherein.

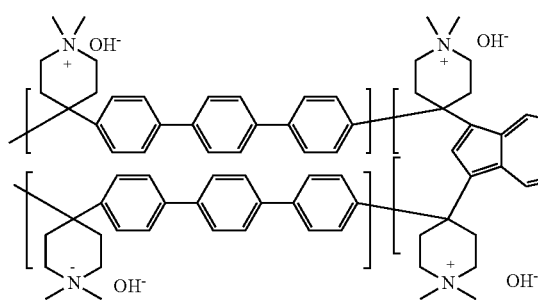
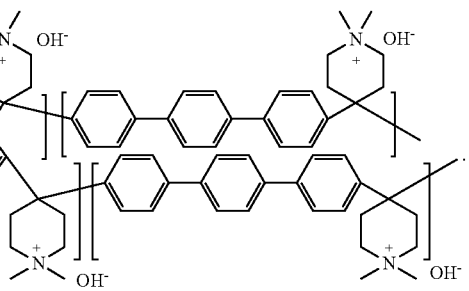

Figure 2:
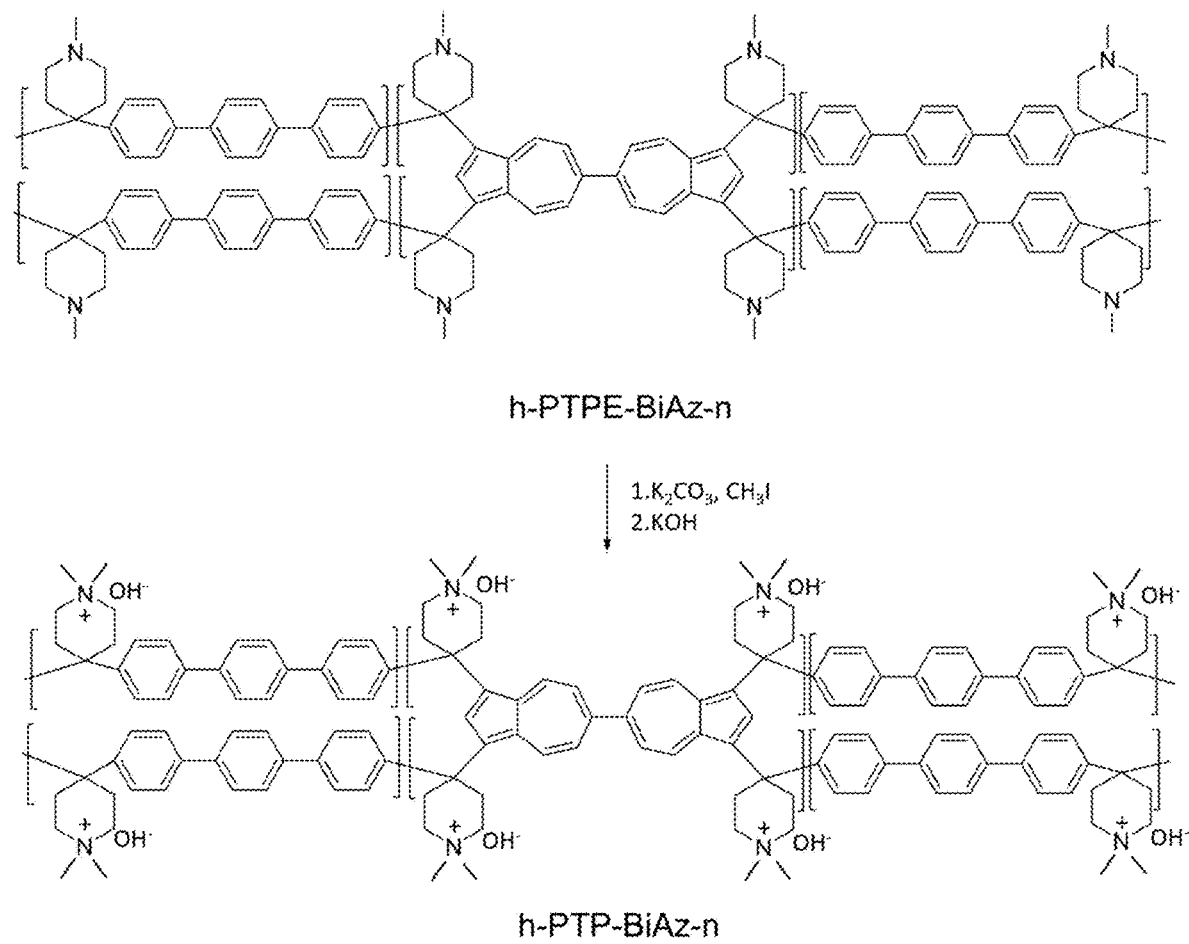
Figure 3:
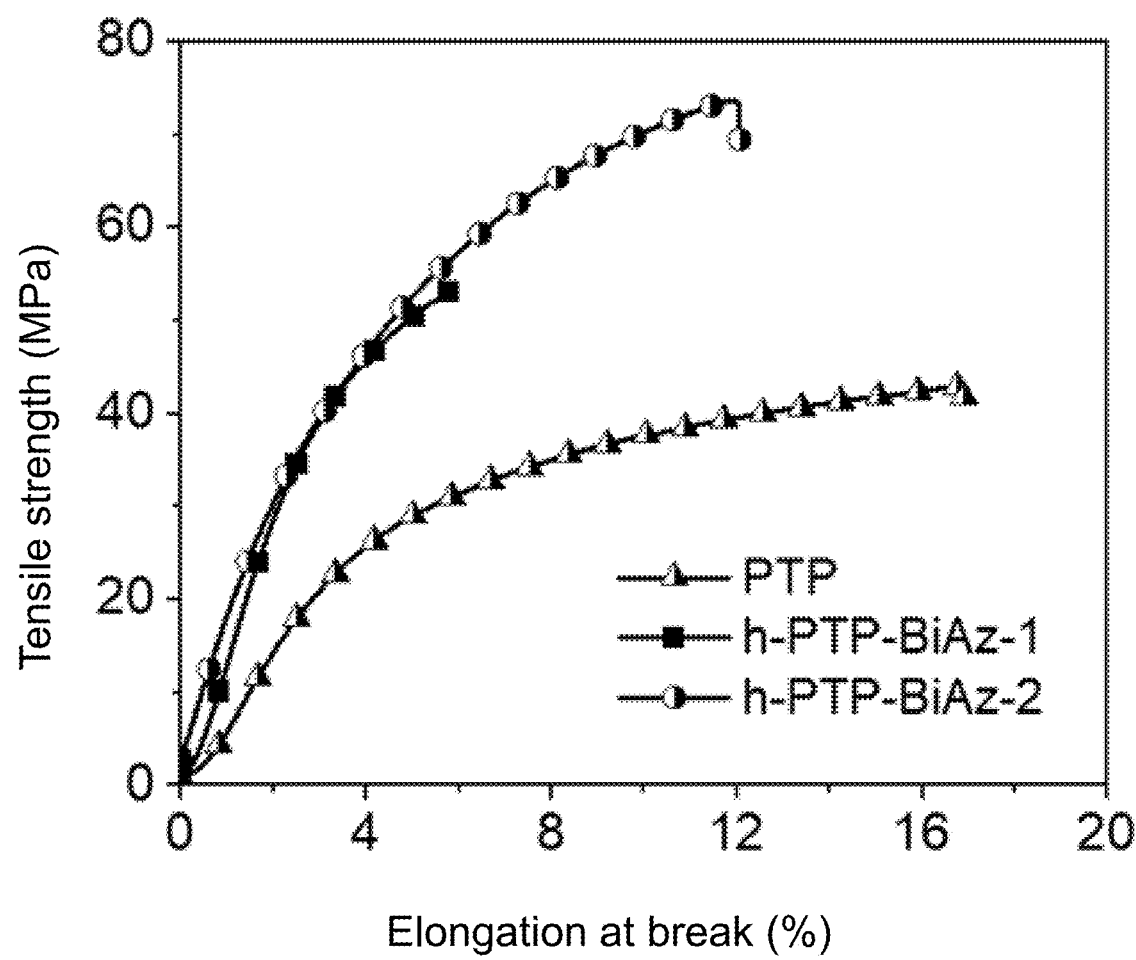
Figure 4:
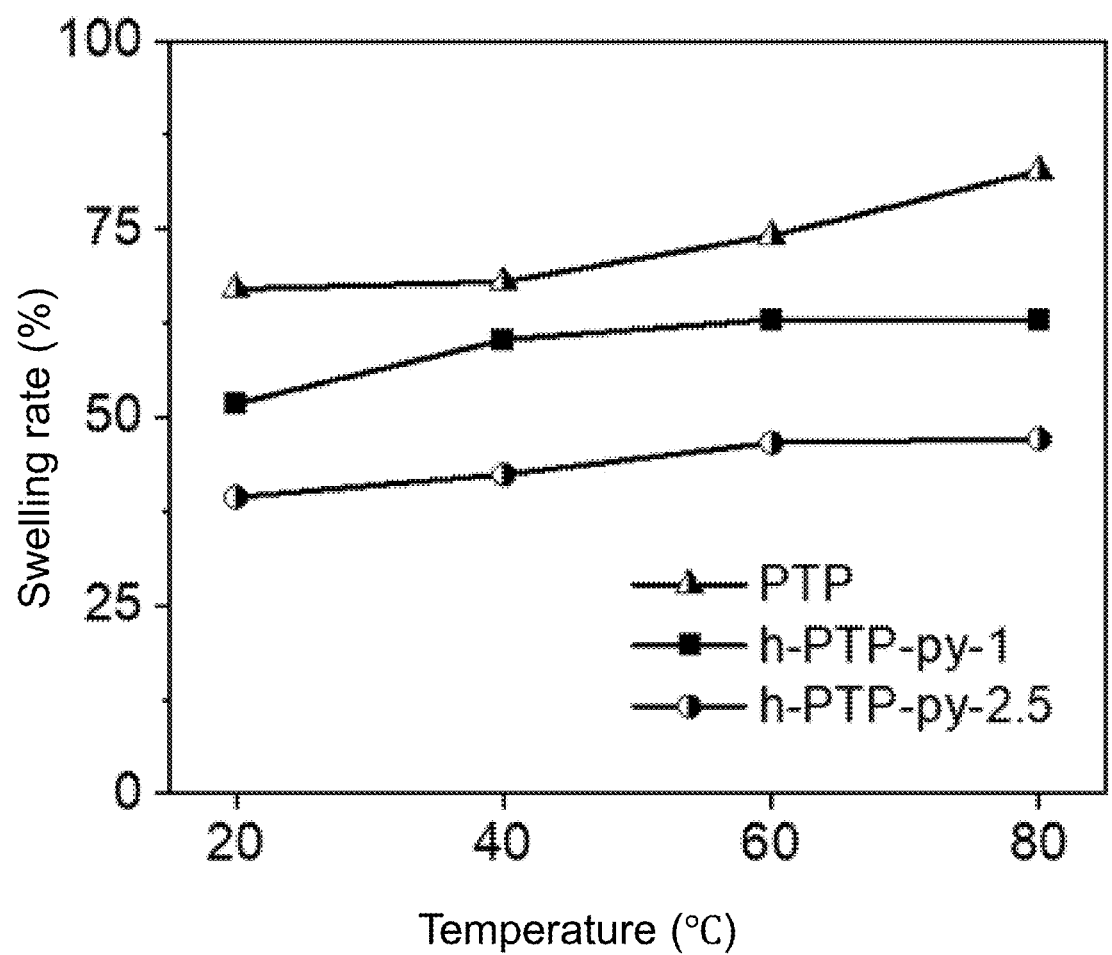
Figure 5:
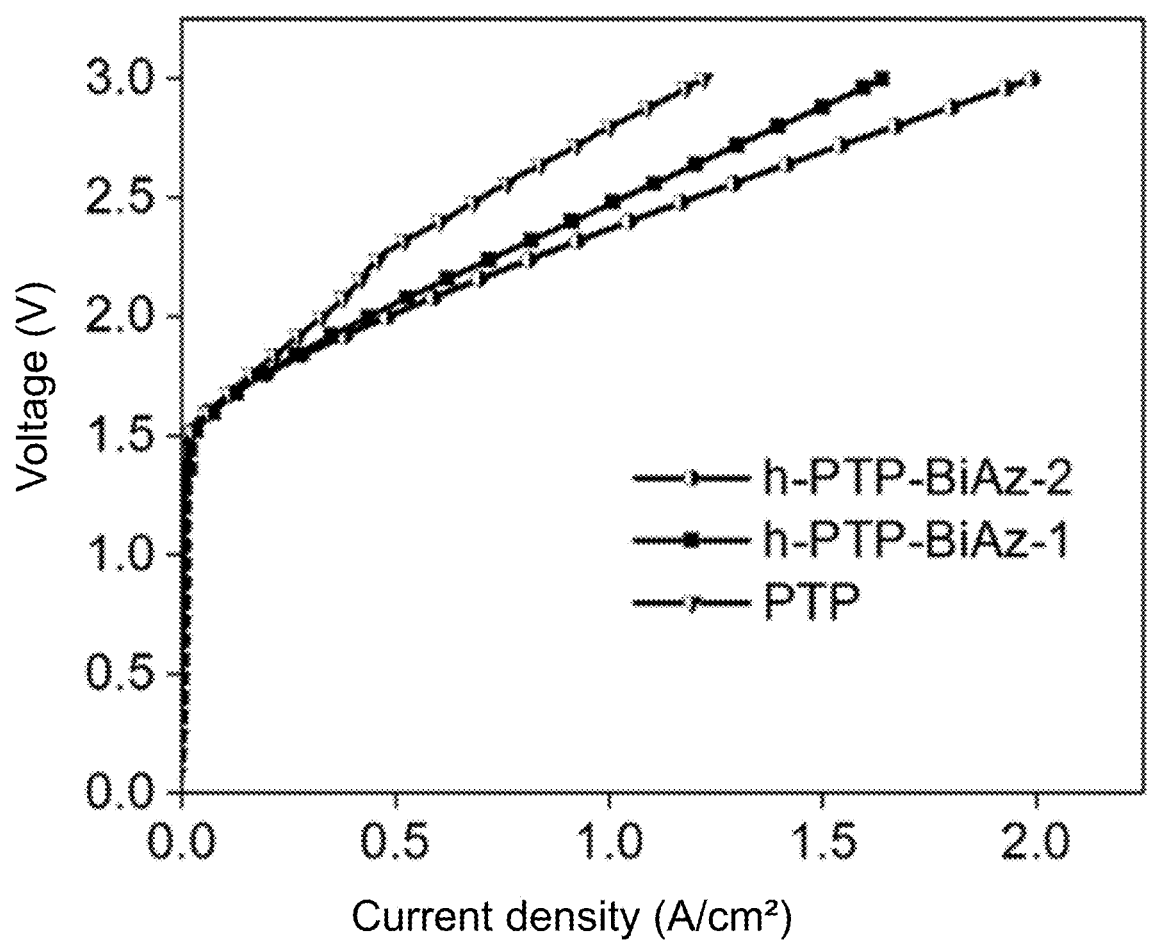

FIG. 2 is a synthetic pathway diagram of 6,6'-biazulenyl-branched poly(p-terphenyl)-piperidine (h-PTP-BiAz-n) according to some embodiments of the present disclosure;

FIG. 3 is a comparison chart of the mechanical properties of azulene-based branched poly(p-terphenyl)-piperidine anion exchange membranes prepared in Example 1 and Example 2 of the present disclosure and the poly(p-terphenyl)-piperidine anion exchange membrane prepared in Comparative Example 1 of the present disclosure;

FIG. 4 is a chart illustrating the swelling rate test result of the azulene-based branched poly(p-terphenyl)-piperidine anion exchange membranes prepared in Example 1 and Example 2 of the present disclosure;

FIG. 5 is a chart illustrating the anion exchange membrane electrolytic water test result of the azulene-based branched poly(p-terphenyl)-piperidine anion exchange membrane prepared in Example 1 and Example 2 of the present disclosure.

DETAILED DESCRIPTION

In order to make the purpose, technical solutions, and advantages of the present disclosure clearer, the present disclosure will be described in further detail below in conjunction with the accompanying drawings, and the described embodiments shall not be regarded as limitations on the present disclosure, and all other embodiments obtained by a person of ordinary skill in the field without creative labor fall within the scope of protection of the present disclosure. All other embodiments obtained by a person of ordinary skill in the art without creative labor fall within the scope of protection of the present disclosure.

In the following description, "some embodiments" are mentioned, which describe a subset of all possible embodiments, but it can be understood that "some embodiments" may be the same subset or different subsets of all possible embodiments and may be combined with each other without conflict. Unless otherwise defined, all technical and scientific terms used in the embodiments of the present disclosure have the same meanings as are commonly understood by those of skill in the art falling within the embodiments of the present disclosure. Terms used in the embodiments of the present disclosure are used only for the purpose of describing the embodiments of the present disclosure and are not intended to limit the present disclosure.

In the following description of the embodiment, the terms "including", "comprising", "having" and "containing" are open-ended terms that are meant to include but not be limited to.

It should be noted that all raw materials/reagents in the embodiments of the present disclosure may be purchased on the market or prepared using conventional methods well-known to those skilled in the art. The term "and/or" in the embodiments of the present disclosure is only used to describe the association relationship between related objects, indicating that there may be three types of relationships. For example, A and/or B represent three situations where A exists alone, B exists alone, or both A and B exist at the same time. Among them, A and B may be singular or plural, and the character "/" generally indicates that the related objects before and after are in a "or" relationship.

In the following description of the embodiment, the term "at least one" refers to one or more, and "more than one" means two or more. "At least one of the following items" or similar expressions refer to any combination of these items, including any combination of single item or plural items. For example, "at least one of a, b, or c" or "at least one of a, b, and c" may all be represented as: a, b, c, a and b, a and c, b and c, or a and b and c, where a, b, and c may be single or multiple, respectively.

Technical personnel in the field should understand that in the following description of the embodiments of the present disclosure, the order of serial numbers does not mean the order of execution. Some or all steps may be executed in parallel or sequentially. The execution order of each process should be determined by its function and internal logic and should not constitute any limitation on the implementation process of the embodiments of the present disclosure.

Terms used in embodiments of the present disclosure are used solely for the purpose of describing particular embodiments and are not intended to limit the present disclosure. The singular forms "a" and "the" used in the present embodiment and the appended claims are also intended to include the majority form unless the context clearly indicates otherwise.

The person skilled in the art should understand that a range of values in an embodiment of the present disclosure should be understood to specifically disclose each intermediate value between the upper and lower limits of the range. Each of the smaller ranges between any of the stated values and the intermediate values within the stated ranges, as well as each of the smaller ranges between any of the other stated values or intermediate values within the stated ranges, are also included in the present disclosure. The upper and lower limits of these smaller ranges are independently included or excluded from the range.

Technical/scientific terms used herein have the same meanings as are commonly understood by those of ordinary skill in the art described in the present disclosure, unless otherwise noted. While the present disclosure describes only preferred methods and materials, any methods and materials similar or equivalent to those described herein also are used in embodiments or test cases of the present disclosure. All literature referred to in the present disclosure is generally incorporated by reference to disclose and describe the methods and/or materials associated with said literature. In the event of a conflict with any incorporated literature, the contents of the present disclosure shall prevail.

It should be noted that all of the ingredients and/or reagents in the embodiments of the present disclosure are purchased in the marketplace or obtained by preparation in accordance with conventional methods known to those skilled in the art.

With the rapid development of the energy sector, clean and efficient hydrogen energy fits into the energy strategy of "carbon peak" and "carbon neutral". It is also a key part of the energy strategy to help realize sustainable development. Green hydrogen can be produced by electrolysis driven by overcapacity of "abandoned solar, abandoned wind, and abandoned electricity", and fuel cells are the core direction of hydrogen energy applications. At present, proton exchange membrane fuel cells and acid electrolysis cells operating under acidic conditions need to rely on precious metal catalysts and expensive proton exchange membranes, resulting in the high cost of hydrogen production and use of hydrogen, which seriously restricts the industrialization process. In contrast, anion exchange membrane fuel cells and alkaline electrolytic cell technologies can use nonprecious metal catalysts and low-cost alkaline electrolyte, significantly reducing the operating costs, and therefore becoming a research hotspot.

An anion exchange membrane (AEM) is a key component of an anion exchange membrane fuel cell and an alkaline electrolytic cell, and its performance directly affects the power density and durability of the device. AEM consists of a polymer backbone, cationic groups, and migratable ions, where the property of the main chain structure and the cationic groups directly determines the performance of AEM. The current research on AEM faces two major technical bottlenecks.
1. The contradiction between conductivity and dimensional stability: because the radius of OH⁻ is larger than that of H⁺, the OH⁻ conductivity in AEM is only 20%-33% of the H⁺ conductivity in the proton exchange membrane under the same condition. The most direct way to increase conductivity is to increase the ion exchange capacity (IEC), and the increase in IEC requires the introduction of more hydrophilic cationic groups, leading to an increase in water uptake by the exchange membrane and greater swelling, further causing degradation of the mechanical properties of the membrane. Therefore, solving the "trade-off" effect between ionic conductivity and dimensional stability of the exchange membrane is crucial for the development of AEM.
2. Under hot alkali (high temperature alkaline) environment, the polymer backbone and cationic groups are susceptible to attack by nucleophilic OH, which triggers the main chain structure breakage, cationic group degradation, and other phenomena, leading to the deterioration of the performance of the exchange membrane, and even reducing the service life of the AEM.

In order to balance the electrical conductivity and mechanical properties, to enhance the alkali stability of the exchange membrane, and to extend the service life, the present disclosure provides an azulene-based branched poly aryl-piperidine anion exchange membrane, and the exchange membrane comprises an azulene-based branched poly aryl-piperidine polymer with a following structure:

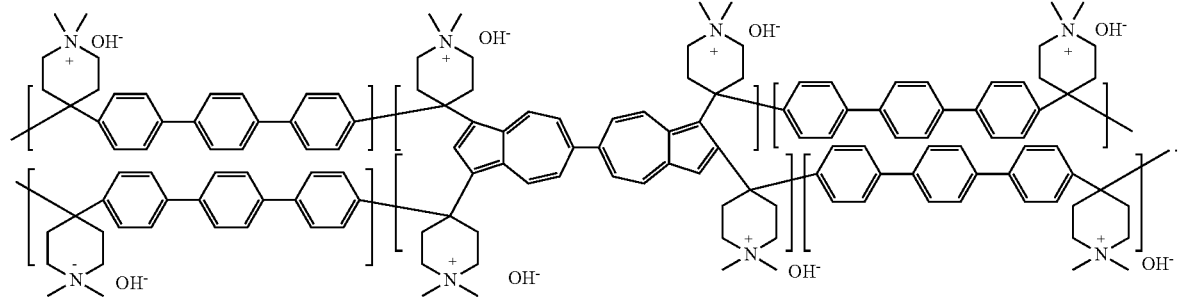

Through the introduction of nucleophilic azulene groups, the structure is less susceptible to OH⁻ attack, improving the alkali stability. The formation of the branched structure allows the molecular chains to entangle with each other, enhancing its mechanical properties.

One or more embodiments of the present disclosure provides an azulene-based branched poly aryl-piperidine anion exchange membrane.

The anion exchange membrane is a polymer membrane material that is selectively permeable to anions. The membrane material usually consists of three parts: a polymer main chain with fixed functional groups (i.e. a polymer matrix, also known as base film), positively charged active groups (i.e. cationic groups), and freely movable anions on the active groups. The core principle is to achieve an ion exchange function through cationic groups (such as quaternary ammonium groups), which is widely used in fields such as fuel cells and hydrogen production from water electrolysis.

In some embodiments, the azulene-based branched poly aryl-piperidine anion exchange membrane comprises the azulene-based branched poly aryl-piperidine polymer. The main chain of the azulene-based branched poly aryl-piperidine polymer is formed by the polymerization of aromatic monomers (e.g., biphenyls, triphenyls, etc.), and azulene is introduced into the main chain as a branched group, and piperidine as a cationic group is fixed on the polymer chain.

In the azulene-based branched poly aryl-piperidine anion exchange membrane consisting of the azulene-based branched poly aryl-piperidine polymer, the branched structure produces a high mechanical strength and reduces the water absorption and swelling rate of the anion exchange membrane, thereby improve dimensional stability. The highly stable cationic groups and nucleophilic azulene groups increase the alkaline stability of the exchange membrane and enhance the OH⁻ conductivity.

In some embodiments, the azulene-based branched poly aryl-piperidine polymer has the following structure:

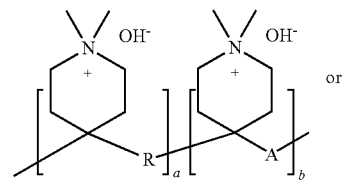

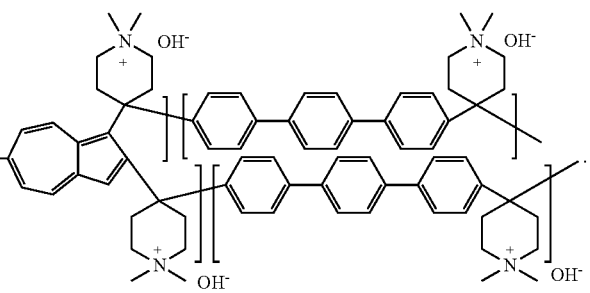

-continued

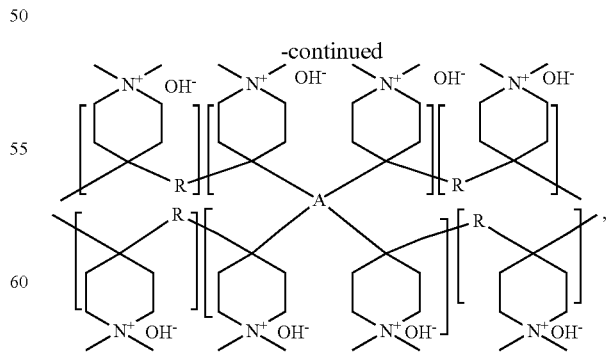

wherein R is an aromatic group, A is an azulene-based branched group, a is any integer greater than or equal to 0, and b is any integer greater than or equal to 1.

In some embodiments, the aromatic group R may be any one of the following structures:
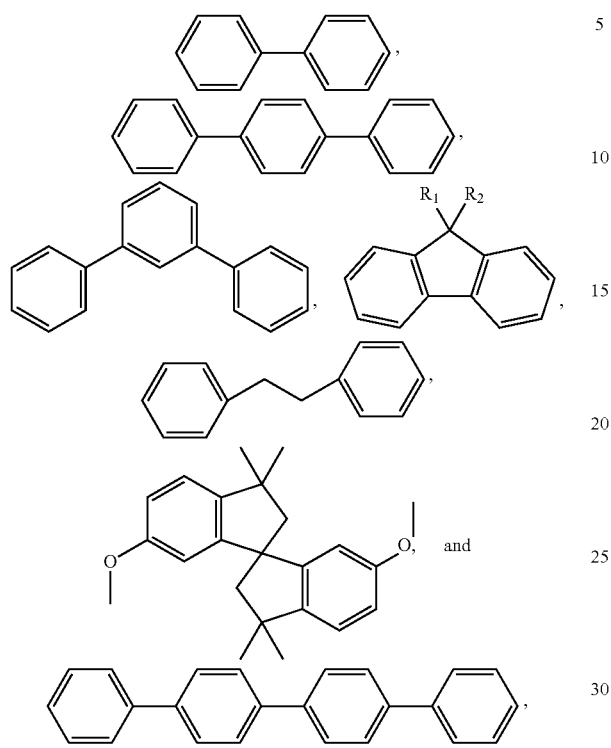
wherein $R_1$ and $R_2$ are preferably one of H, a long aliphatic chain, or a long aromatic chain.
In some embodiments, the azulene-based branched group A may be any one of the following structures:
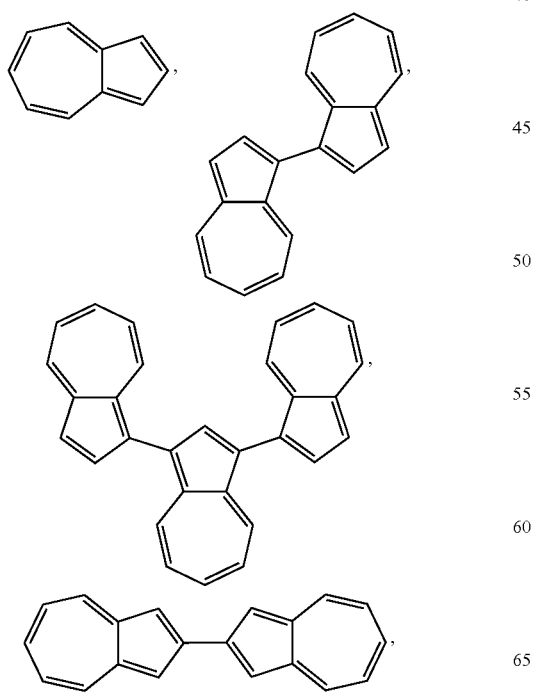
-continued
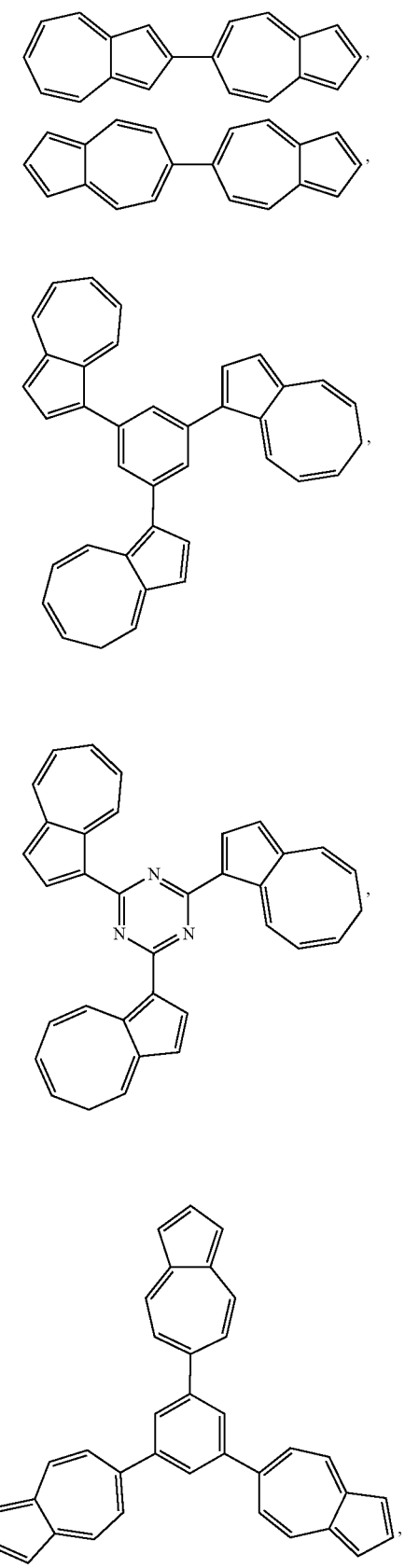

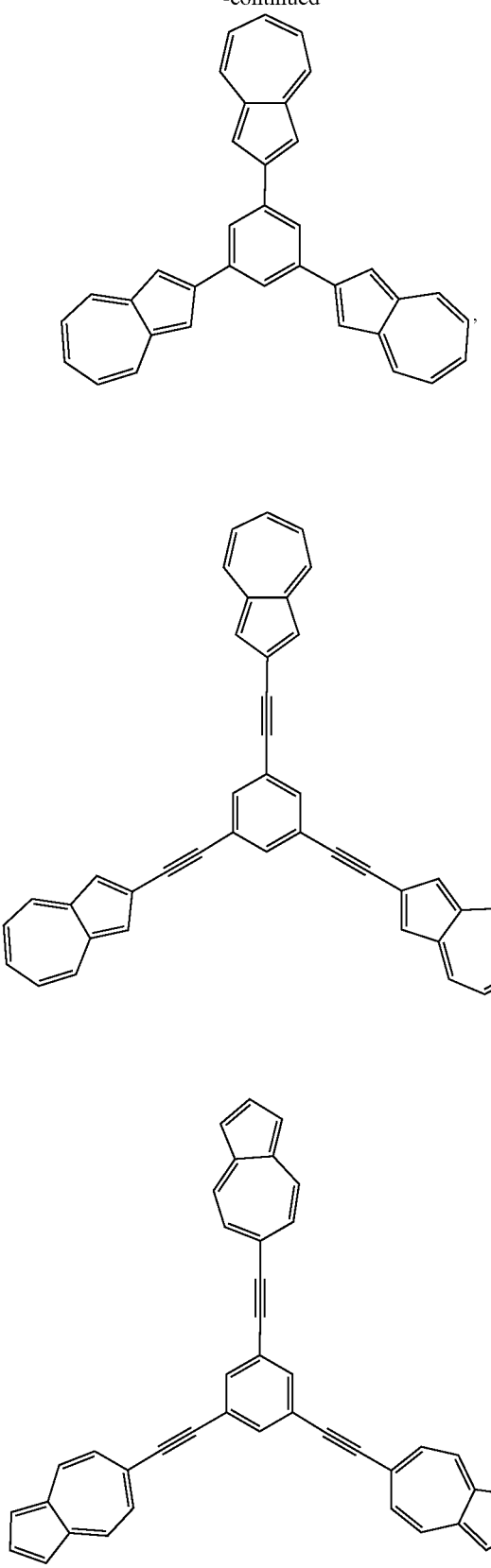
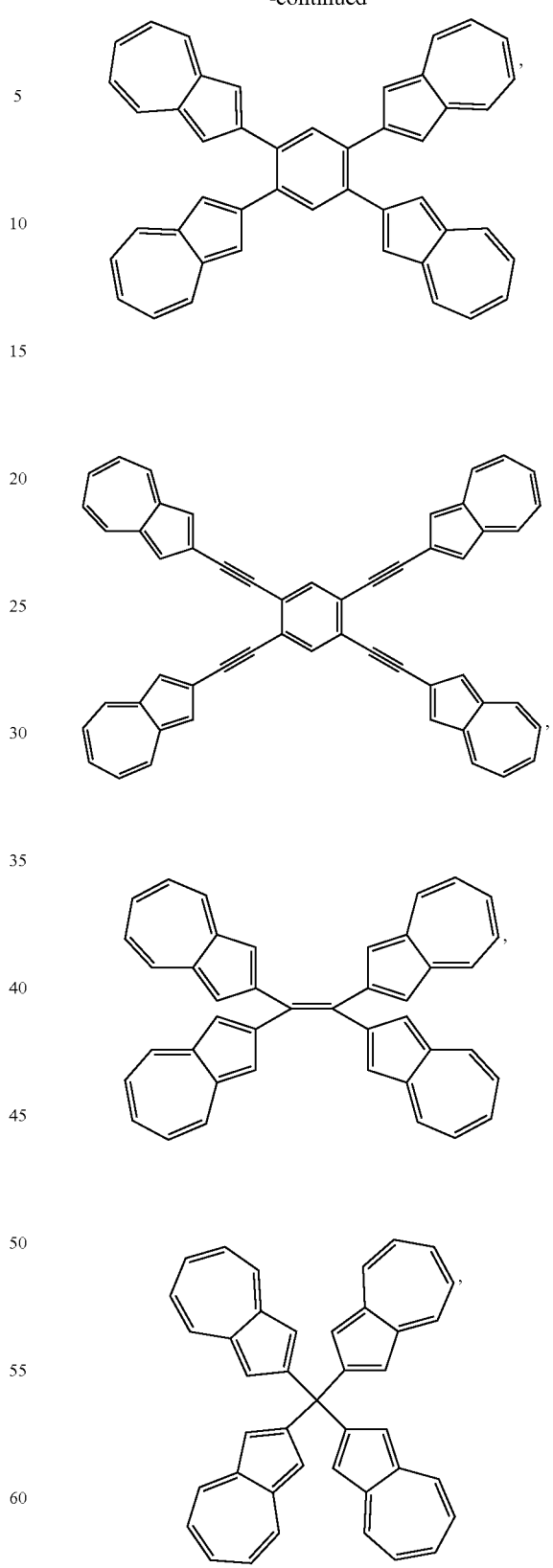

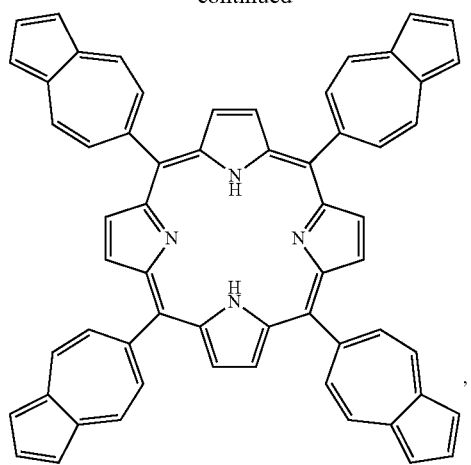
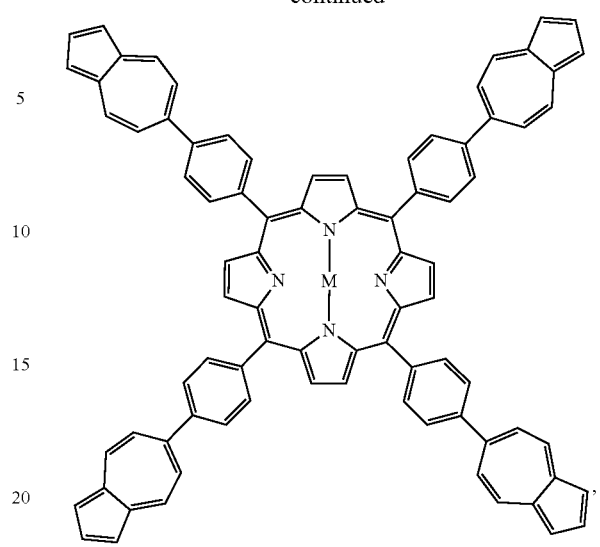
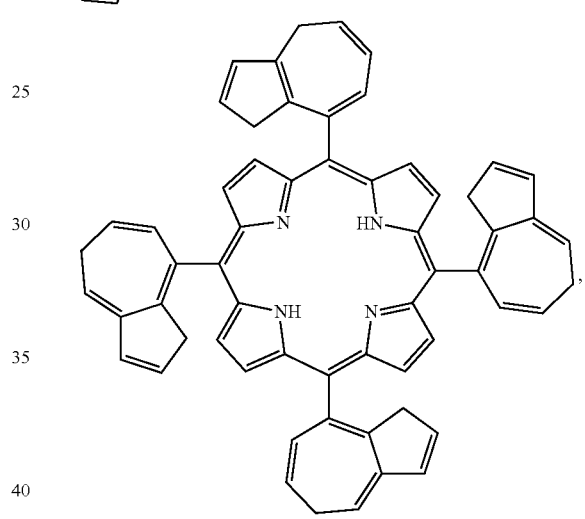
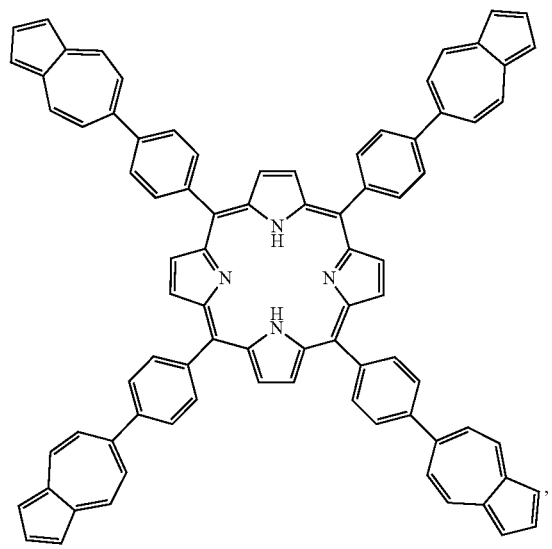
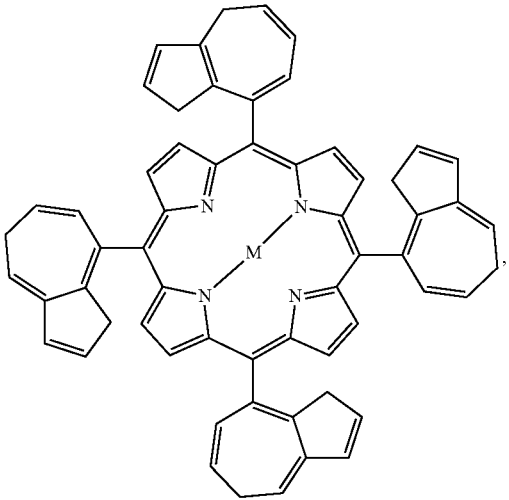

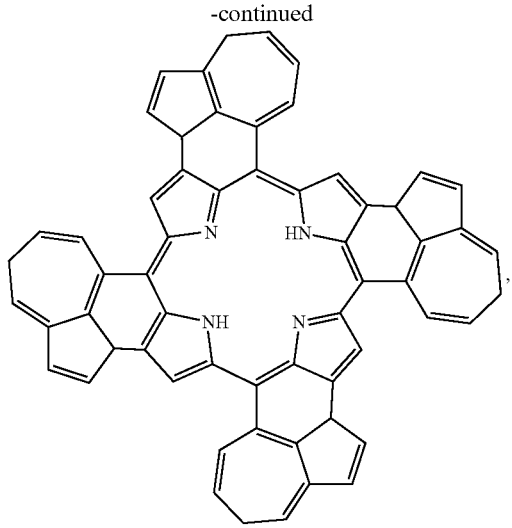
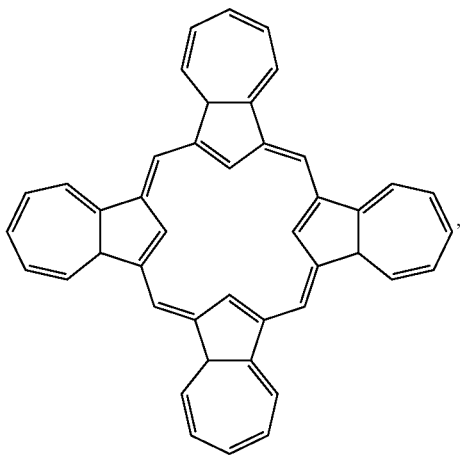
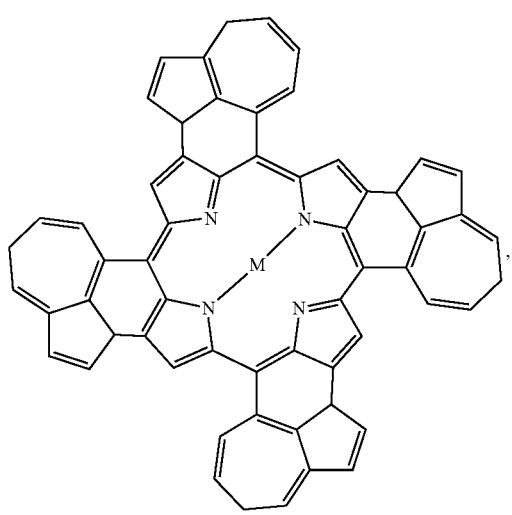
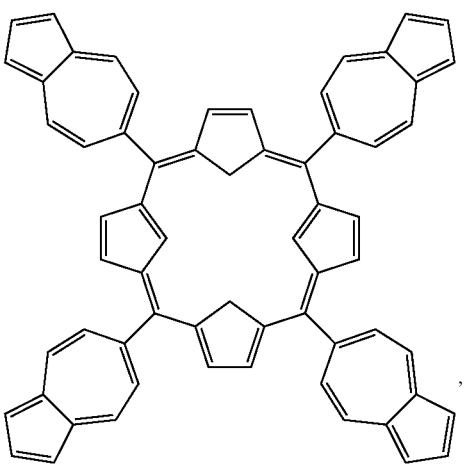
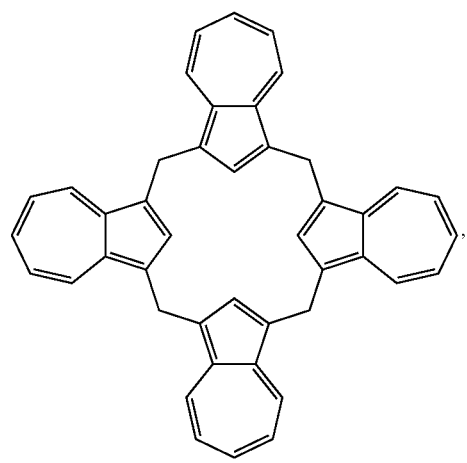
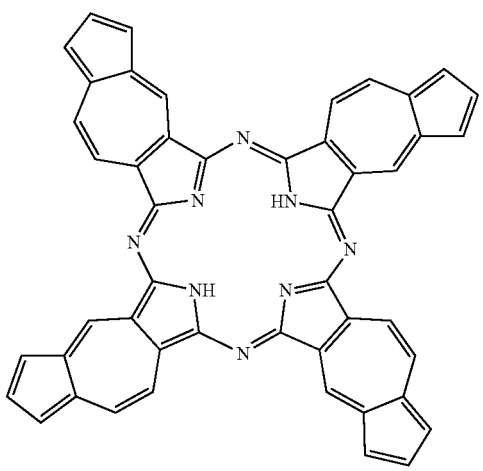

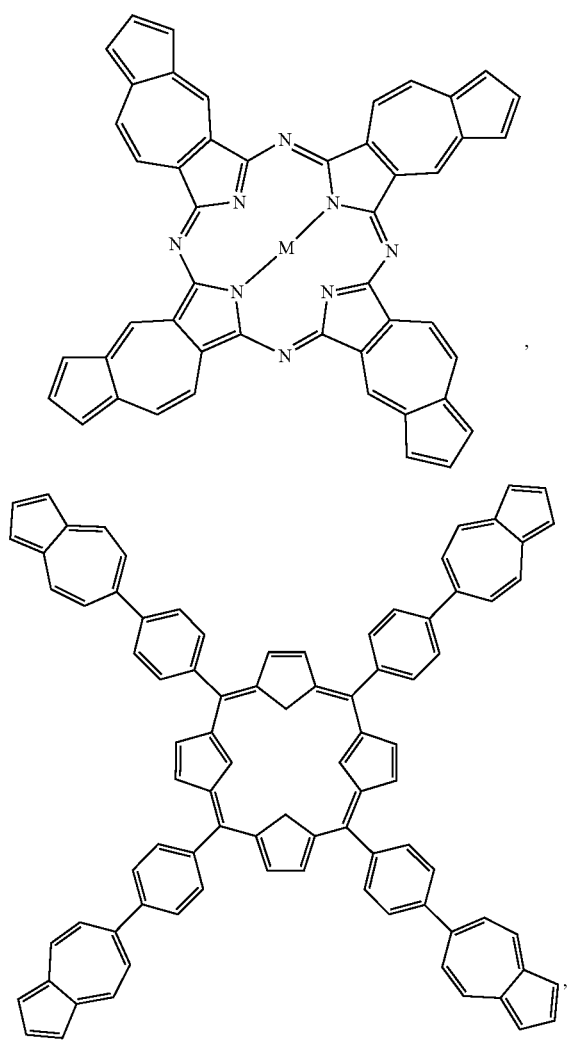
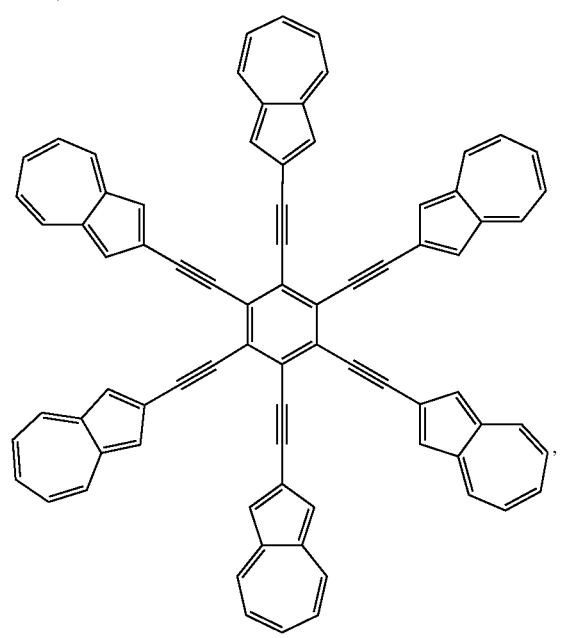
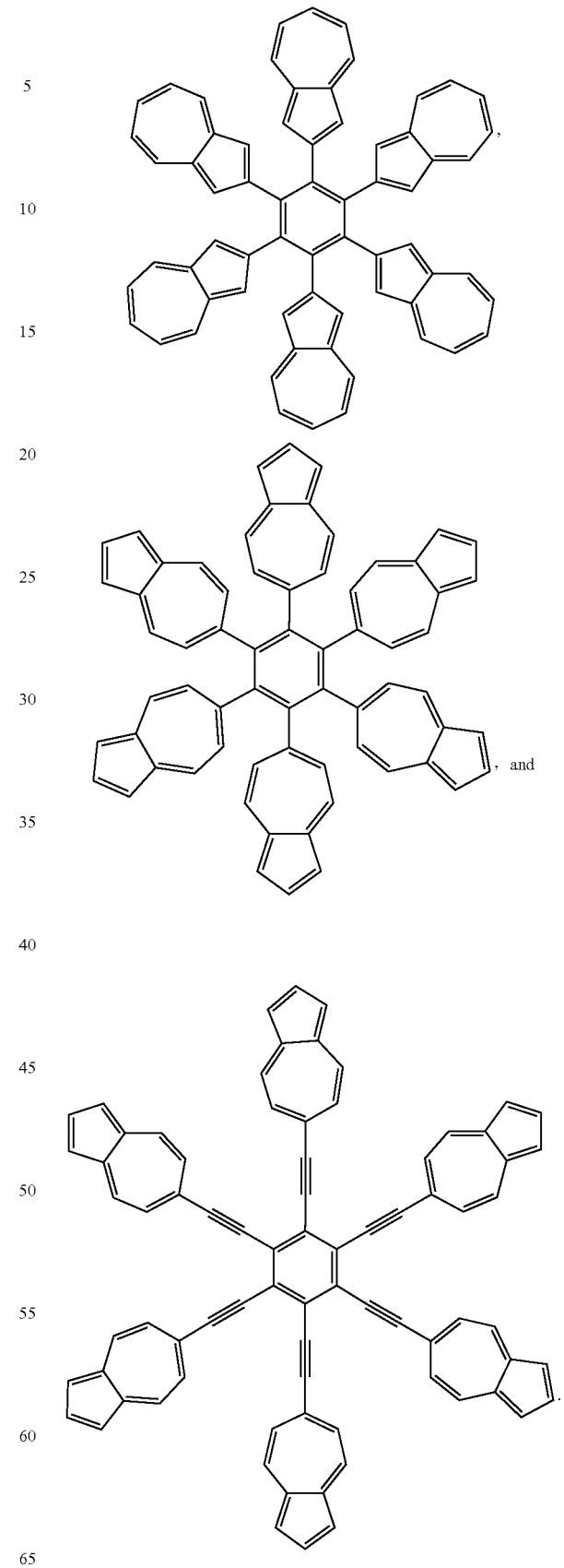

In some embodiments, the azulene-based branched poly aryl-piperidine polymer has the following structure:

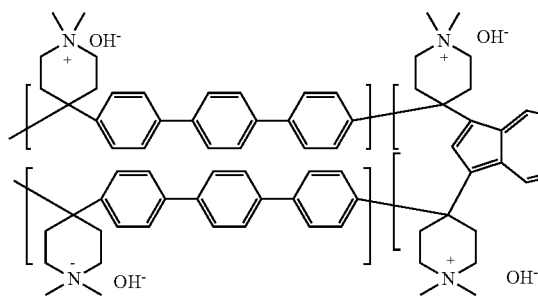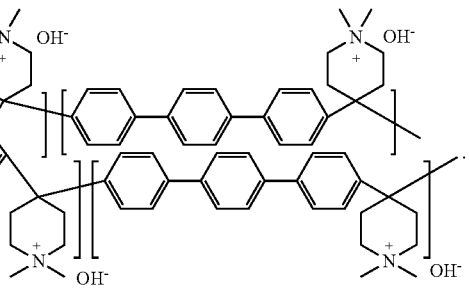

One or more embodiments of the present disclosure provides a preparation method of the azulene-based branched poly aryl-piperidine anion exchange membrane. The preparation method comprises the following steps.

Step S1, preparing an azulene-based branched poly aryl-piperidine precursor.

In some embodiments, aromatic monomer, azulene-based branched monomer, and N-methyl-4-piperidone are dissolved in a first organic solvent, followed by adding trifluoroacetic acid and trifluoromethanesulfonic acid for reacting, and the azulene-based branched poly aryl-piperidine precursor is collected.

Specifically, the aromatic monomer, the azulene-based branched monomer, and the N-methyl-4-piperidone may be first dissolved in a first organic solvent according to a certain ratio to obtain a mixture; the mixture is subjected to a stirring reaction for a first time at a first temperature, then a certain molar ratio of trifluoroacetic acid and trifluoromethanesulfonic acid is added for reaction for a second time at the second temperature to obtain a viscous solution, the viscous solution is placed in an excess of methanol to precipitate, and polymer solids are collected; and the polymer solids are washed with potassium carbonate solution and dried to obtain the azulene-based branched poly aryl-piperidine precursor.

In some embodiments, the stirring reaction is carried out at room temperature and a dark condition.

In some embodiments, the first temperature is within a range of −10° C. to 20° C. In some embodiments, the first temperature is also within a range of −5° C. to 15° C. In some embodiments, the first temperature is also within a range of 0° C. to 4° C.

In some embodiments, the first time is within a range of 10 min to 60 min. In some embodiments, the first time is also within a range of 15 min to 45 min. In some embodiments, the first time is also 30 min.

In some embodiments, the second temperature is within a range of −10° C. to 20° C. In some embodiments, the second temperature is also within a range of −5° C. to 15° C. In some embodiments, the second temperature is also within a range of 0° C. to 4° C.

In some embodiments, the second time is within a range of 12 h to 36 h. In some embodiments, the second time is within a range of 20 h to 30 h. In some embodiments, the second time is 24 h.

In some embodiments, the washing and drying process involve washing overnight with potassium carbonate solution, followed by three washes with deionized water, and then vacuum drying. There is no special limitation on the drying condition, and it is sufficient to be able to obtain a constant weight product. In some embodiments, the drying temperature is within a range of 60° C. to 100° C. In some embodiments, the drying temperature is within a range of 70° C. to 90° C. In some embodiments, the drying temperature is 80° C. In some embodiments, the drying time is within a range of 12 h to 36 h. In some embodiments, the drying time is within a range of 20 h to 30 h. In some embodiments, the drying time is 24 h.

In some embodiments, the molar ratio of the aromatic monomer to the azulene-based branched monomer is (0-200):1. In some embodiments, the molar ratio of the aromatic monomer to the azulene-based branched monomer is (0-150):1. In some embodiments, the molar ratio of the aromatic monomer to the azulene-based branched monomer is (0-99):1. Understandably, when the molar ratio of the aromatic monomer to the azulene-based branched monomer is greater than 99:1, that is, when the content of the azulene-based branched monomer is too low, the improvement effect of the azulene-based branched monomer on the performance of the anion exchange membrane is weak.

In some embodiments, the molar ratio of the sum of the addition amounts of the azulene-based branched monomer and the aromatic monomer to the addition amount of the N-methyl-4-piperidone is 1:(0.5-2). In some embodiments, the molar ratio of the sum of the addition amounts of the azulene-based branched monomer and the aromatic monomer to the addition amount of the N-methyl-4-piperidone is 1:(0.7-1.5). In some embodiments, the molar ratio of the sum of the addition amounts of the azulene-based branched monomer and the aromatic monomer to the addition amount of the N-methyl-4-piperidone is 1:(0.9-1.2).

In some embodiments, the molar ratio of the N-methyl-4-piperidone to the trifluoroacetic acid is 1:(0.3-1.8). In some embodiments, the molar ratio of the N-methyl-4-piperidone to the trifluoroacetic acid is 1:(0.5-1.5). In some embodiments, the molar ratio of the N-methyl-4-piperidone to the trifluoroacetic acid is 1:(0.8-1.2). Understandably, when the molar ratio of the N-methyl-4-piperidone to the trifluoroacetic acid is less than 1:1.2, the reaction rate decreases. When the molar ratio of the N-methyl-4-piperidone to the trifluoroacetic acid is greater than 1:0.8, severe fuming occurs during the subsequent reaction (addition of the trifluoromethanesulfonic acid).

In some embodiments, the molar ratio of the N-methyl-4-piperidone to the trifluoromethanesulfonic acid is 1:(3-18). In some embodiments, the molar ratio of the N-methyl-4-piperidone to the trifluoromethanesulfonic acid is 1:(5-15). In some embodiments, the molar ratio of the N-methyl-4-piperidone to the trifluoromethanesulfonic acid is 1:(8-12). Understandably, when the molar ratio of the N-methyl- 4-piperidone to the trifluoromethanesulfonic acid is less than 1:12, an excessively fast localized rate of polymerization occurs, resulting in an overly broad molecular weight distribution. When the molar ratio of the N-methyl-4-piperidone to the trifluoromethanesulfonic acid is greater than 1:8, the reaction yield and rate are reduced.

In some embodiments, the first organic solvent is preferably any one of chloroform, dichloromethane, carbon tetrachloride, dichloroethane, and 1,1,2,2-tetrachloroethane. The first organic solvent serves the role of dissolving the reactants.

Step S2, preparing a cationic azulene-based branched poly aryl-piperidine.

In some embodiments, the azulene-based branched poly aryl-piperidine precursor is dissolved in a second organic solvent, potassium carbonate and iodomethane are added for conducting a light avoidance reaction, followed by adding ethyl acetate for purifying, and the cationic azulene-based branched poly aryl-piperidine is collected.

It should be noted that in the embodiments of the present disclosure, the N-methyl-4-piperidone reacts with the iodomethane to form a quaternary ammonium cation.

It should be noted that in the embodiments of the present disclosure, the ethyl acetate, as a good solvent for the iodomethane, dissolves the unreacted monomers, while acting as a poor solvent for the polymer, causing the polymer to precipitate, thereby purifying the polymer.

In some embodiments, a time of the light avoidance reaction is within a range of 12 h to 36 h. In some embodiments, the time of the light avoidance reaction is within a range of 18 h to 30 h. In some embodiments, the time of the light avoidance reaction is 24 h.

In some embodiments, the temperature of the light avoidance reaction is a room temperature.

In some embodiments, the second organic solvent is preferably any one of acetonitrile, tetrahydrofuran, N-methyl pyrrolidone, dimethyl sulfoxide, N, N-dimethylacetamide, N, N-dimethylformamide, and sulfolane. The aforementioned second organic solvent serves the role of dissolving the reactants and precipitating the polymer.

Step S3, preparing the azulene-based branched poly aryl-piperidine anion exchange membrane.

In some embodiments, the cationic azulene-based branched poly aryl-piperidine is dissolved in a third organic solvent, a $Cl^-$-type membrane is collected, an ion exchange is performed on the $Cl^-$-type membrane to obtain an $OH^-$-type membrane, the $OH^-$-type membrane is purified, and the azulene-based branched poly aryl-piperidine anion exchange membrane is collected.

In some embodiments, a first mass of the cationic azulene-based branched poly aryl-piperidine may be dissolved in a first volume of the third organic solvent. In some embodiments, the first mass is within a range of 0.1 g to 5 g. In some embodiments, the first mass is within a range of 0.5 g to 3 g. In some embodiments, the first mass is 1 g. In some embodiments, the first volume is within a range of 10 mL to 50 mL. In some embodiments, the first volume is within a range of 20 mL to 40 mL. In some embodiments, the first volume is 30 mL.

In some embodiments, a time of the ion exchange is within a range of 5 h to 20 h. In some embodiments, the time of the ion exchange is within a range of 10 h to 15 h. In some embodiments, the time of the ion exchange is 12 h.

In some embodiments, a temperature of the ion exchange is within a range of 50° C. to 100° C. In some embodiments, the temperature of the ion exchange temperature is within a range of 60° C. to 90° C. In some embodiments, the temperature of the ion exchange temperature is 80° C.

One or more embodiments of the present provide an alkaline fuel cell and an alkaline electrolytic cell. In some embodiments, the alkaline fuel cell and the alkaline electrolytic cell include the azulene-based branched poly aryl-piperidine anion exchange membrane as described above. In some embodiments, the azulene-based branched poly aryl-piperidine anion exchange membrane in the alkaline fuel cell and the alkaline electrolytic cell is obtained by the preparation method as described above.

one or more embodiments of the present disclosure provides a use of the azulene-based branched poly aryl-piperidine anion exchange membrane in the preparation of the alkaline fuel cell and the alkaline electrolytic cell, as well as the use of the azulene-based branched poly aryl-piperidine anion exchange membrane prepared by the above method in the preparation of the alkaline fuel cell and the alkaline electrolytic cell.

In some embodiments, an $OH^-$ conductivity of the azulene-based branched poly(p-terphenyl)-piperidine anion exchange membrane is at least 110 mS/cm at 80° C. In some embodiments, the $OH^-$ conductivity of the azulene-based branched poly(p-terphenyl)-piperidine anion exchange membrane is at least 150 mS/cm at 80° C. In some embodiments, the $OH^-$ conductivity of the azulene-based branched poly(p-terphenyl)-piperidine anion exchange membrane is at least 154 mS/cm at 80° C. In some embodiments, the $OH^-$ conductivity of the azulene-based branched poly(p-terphenyl)-piperidine anion exchange membrane is at least 168 mS/cm at 80° C.

In some embodiments, an ion exchange capacity of the azulene-based branched poly(p-terphenyl)-piperidine anion exchange membrane is within a range of 1 mmol/g to 4 mmol/g. In some embodiments, the ion exchange capacity of the azulene-based branched poly(p-terphenyl)-piperidine anion exchange membrane is within a range of 2 mmol/g to 3 mmol/g. In some embodiments, the ion exchange capacity of the azulene-based branched poly(p-terphenyl)-piperidine anion exchange membrane is 2.4 mmol/g.

In some embodiments, a swelling rate of the azulene-based branched poly(p-terphenyl)-piperidine anion exchange membrane is within a range of 40% to 70%. In some embodiments, the swelling rate of the azulene-based branched poly(p-terphenyl)-piperidine anion exchange membrane is within a range of 50% to 60%. In some embodiments, the swelling rates of the azulene-based branched poly(p-terphenyl)-piperidine anion exchange membrane is 54%.

In some embodiments, a tensile strength of the azulene-based branched poly(p-terphenyl)-piperidine anion exchange membrane is within a range of 40 MPa to 70 MPa. In some embodiments, the tensile strength of the azulene-based branched poly(p-terphenyl)-piperidine anion exchange membrane is within a range of 50 MPa to 60 MPa. In some embodiments, the tensile strength of the azulene-based branched poly(p-terphenyl)-piperidine anion exchange membrane is 55 MPa.

In some embodiments, an elongation at break of the azulene-based branched poly(p-terphenyl)-piperidine anion exchange membrane described in embodiments of the present is within a range of 3% to 15%. In some embodiments, the elongation at break of the azulene-based branched poly (p-terphenyl)-piperidine anion exchange membrane is within a range of 6% to 12%. In some embodiments, the elongation at break of the azulene-based branched poly(p-terphenyl)-piperidine anion exchange membrane is 10%.

In some embodiments, the azulene-based branched poly (p-terphenyl)-piperidine anion exchange membrane may maintain alkaline stability for 600 h to 1400 h in 1 M KOH at 80° C. In some embodiments, the azulene-based branched poly(p-terphenyl)-piperidine anion exchange membrane may maintain alkaline stability for 800 h-1200 h in 1 M KOH at 80° C. In some embodiments, the azulene-based branched poly(p-terphenyl)-piperidine anion exchange membrane may maintain alkaline stability for 1000 h in 1 M KOH at 80° C.

Beneficial effects of embodiments of the present disclosure, as compared to the prior art, include at least as follows.

The azulene-based branched poly aryl-piperidine anion exchange membrane provided in the embodiments of the present disclosure have a high $OH^-$ conductivity (the $OH^-$ conductivity being greater than 110 mS cm$^{-1}$ at 80° C.), a high mechanical strength (the tensile strength being greater than 35 MPa, the elongation at break being greater than 10%), a high dimensional stability, a good processability, and an excellent alkaline stability (greater than 500 h) in 1 M KOH at 80° C.

The azulene-based branched poly aryl-piperidine anion exchange membrane provided by the embodiments of the present disclosure is an alkaline anion exchange membrane prepared by polymerization and quaternization, in which the branched structure produces a high mechanical strength, which greatly reduces water absorption and swelling rate of the anion exchange membrane, thus improving the dimensional stability; and high stability cationic groups and nucleophilic azulene groups increase its alkaline stability. The exchange membrane is suitable for use as the anion exchange membrane material in the alkaline fuel cell and the alkaline electrolytic cell due to its high $OH^-$ conductivity, alkaline stability, and high mechanical strength.

Compared with other types of branched poly aryl-piperidine anion exchange membrane, the introduction of nucleophilic azulene groups into its molecular structure makes the structure less susceptible to $OH^-$ attack, thereby enhancing its alkaline stability. The formation of branched structure allows the molecular chains to entangle with each other, enhancing its mechanical properties.

The technical methods of the present disclosure will be further elaborated below in connection with specific examples. It should be noted that the reaction conditions, reaction materials and dosages of reaction materials in Example 1, Example 2, and Comparative Example 1 are only intended to illustrate the preparation method of the azulene-based branched poly(aryl-piperidine) anion exchange membrane, and do not limit the scope of protection of the present disclosures.

The following are the devices involved in the embodiments and the used test methods.

1. Test method of the ion exchange capacity (IEC): take a Cl$^-$-type membrane or a Br$^-$-type membrane of the azulene-based branched poly aryl-piperidine polymer, dry the Cl$^-$-type membrane or the Br$^-$-type membrane in a vacuum oven at 75° C. and weigh, and record a mass of the dried film (i.e., the dried Cl$^-$-type film or the dried Br$^-$-type film). Immerse the dried film in 25 mL of 0.2 M sodium nitrate (NaNO$_3$) solution for 6 h, repeat three times, and collect the NaNO$_3$ solution after the ion exchange. Add the indicator of potassium chromate solution to the NaNO$_3$ solution after the ion exchange and titrate with 0.01 M standard silver nitrate (AgNO$_3$) solution, complete the titration when a brick red precipitate appears and does not disappear after shaking. Record the volume of AgNO$_3$ solution consumed. Obtain the IEC by dividing the product of the concentration and the volume of AgNO$_3$ solution by the mass of the dried film.

2. Test method of the conductivity: the used electrochemical workstation being produced by Shanghai Chenhua Instrument Co., Ltd., with a model of CHI660E. Test the conductivity of branched membrane at different temperatures using the electrochemical impedance spectroscopy (EIS), with a potential amplitude of 10 mV. In order to minimize the error caused by contact resistance on the measurement results, the measurement resistance being the in-plane resistance of the membrane sample. In the experiment, cut the membrane into a size of 40 mm×10 mm, place the cut membrane in a fixture, and place the fixture in pure water, the test temperature being from 30° C. to 80° C., test the resistance of the membrane every 10° C., and keep warm for 1 h before the test. Finally, calculate the ionic conductivity σ of the sample according to the formula: σ=l/(wdR), where l is the length of the membrane between the electrodes (cm), w is the width of the membrane (cm), d is the thickness of the membrane (μm), and R is the measured membrane resistance (mΩ).

3. Test method of the alkaline fuel cell performance: the used instrument being produced by the United States Scribner Associates co., Inc., with the model of the 850e multi-range fuel cell test system, operated in the current mode. Perform the test under conditions of fully humidified H$_2$ and O$_2$, the test temperature of 60° C. and 80° C., and the flow rates of H$_2$ and O$_2$ of 200 mL/min.

4. Test method of electrolysis water performance of the anion exchange membrane: assemble membrane electrode assembly (MEA) electrolytic cell, in which the anode is a titanium felt loaded with IrO$_2$, the cathode is a carbon paper loaded with Pt/C, the electrode area is 4 cm$^2$, and the electrolyte is 1 M KOH. The used test instrument being CHI660e and perform linear voltammetry scanning test on electrolytic cell.

5. Test method of the tensile strength: using InstronM3300 electronic universal testing machine to test the dry film sample of 5×0.5 cm, with a tensile rate of 5 mm/min.

6. Test method of the alkaline stability: immerse the prepared anionic membrane in NaOH solution at different temperatures and different concentrations, respectively, and at the same time, measure its conductivity, and analyze its alkaline stability based on the change of conductivity of the electrolyte membrane.

Example 1

Example 1 provides a method for preparing the azulene-based branched poly(p-terphenyl)-piperidine anion exchange membrane (i.e., a 6,6'-biazulenyl-branched poly (p-terphenyl)-piperidine (h-PTP-BiAz-1) anion exchange membrane), including the following steps.

(1) Preparation of the Azulene-Based Branched Poly Aryl-Piperidine Precursor (i.e., a 6,6'-Biazulenyl-Branched Poly (p-Terphenyl)-Piperidine Precursor Polymer (h-PTPE-BiAz-n))

P-terphenyl (TP, 2.30 g, 10 mmol), 6,6'-biazulenyl (BiAz, 0.025 g, 0.10 mmol), and N-methyl-4-piperidone (mPip, 1.15 g, 10.15 mmol) were added to dichloromethane (DCM, 17 mL) to form a solution, the solution was stirred at 0° C. for 30 min, and trifluoroacetic acid (TFA, 0.82 mL, 10.1 mmol) and trifluoromethanesulfonic acid (TFSA, 8.97 mL, 101 mmol) were added dropwise into the solution, and after 6 h, the viscous solution was obtained and poured into an excess of methanol to precipitate, and the resulting blue polymer fibers were collected. The resulting solid (i.e., blue polymer fibers) was washed with a 1 M potassium carbonate ($K_2CO_3$) solution overnight at 50° C., then washed with deionized water for three times, and dried under vacuum at 80° C. for 24 h to obtain the 6,6'-biazulenyl-branched poly(p-terphenyl)-piperidine (h-PTPE-BiAz-1). In the h-PTP-BiAz-n, n is the molar content of the BiAz monomer in the percentage form.

Figure 1:
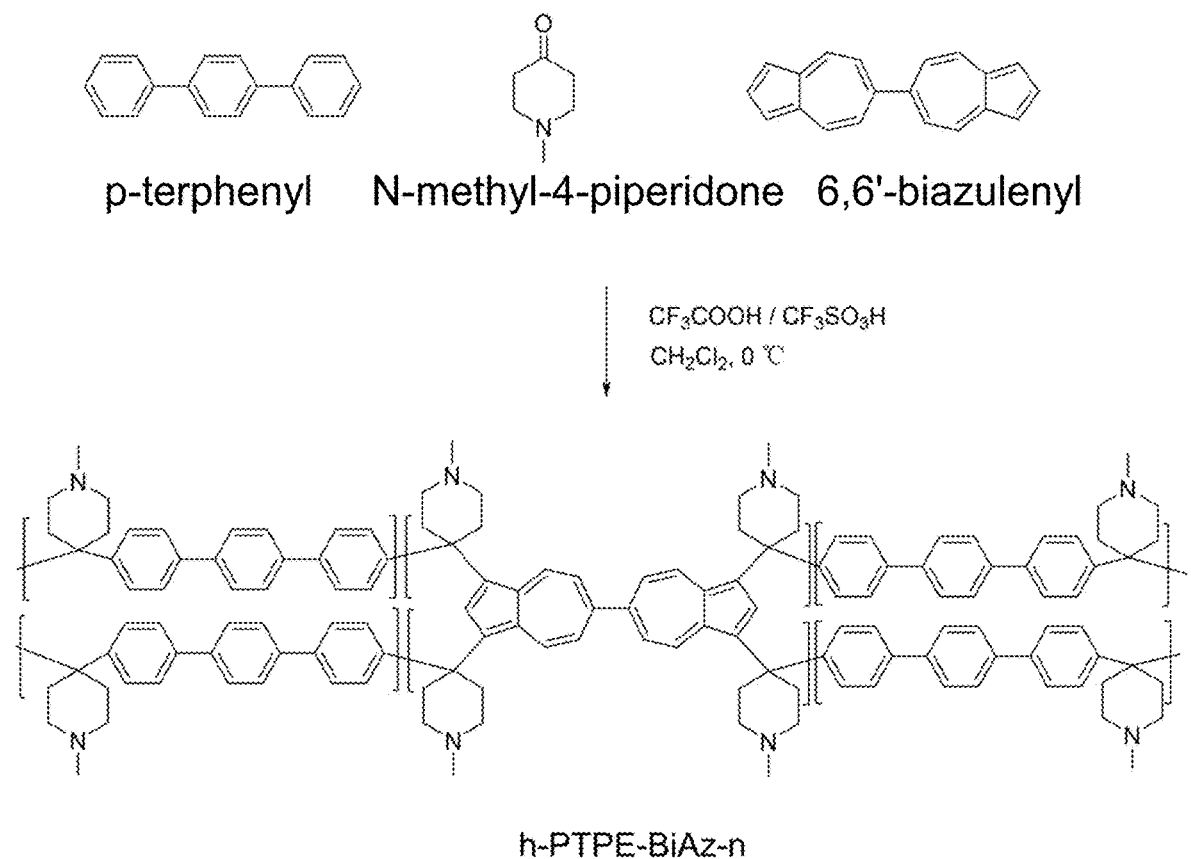
FIG. 1 is a synthetic pathway diagram of 6,6'-biazulenyl-branched poly(p-terphenyl)-piperidine precursor polymer according to some embodiments of the present disclosure.

In order to facilitate the understanding of the above synthesis process of the 6,6'-biazulenyl-branched poly(p-terphenyl)-piperidine precursor polymer, the present disclosure provides a synthetic pathway diagram of the 6,6'-biazulenyl-branched poly(p-terphenyl)-piperidine precursor polymer (h-PTPE-BiAz-n). As shown in FIG. 1, FIG. 1 is a synthetic pathway diagram of the 6,6'-biazulenyl-branched poly(p-terphenyl)-piperidine precursor polymer according to some embodiments of the present disclosure.

(2) Preparation of the Cationic Azulene-Based Branched Poly Aryl-Piperidine (i.e., a 6,6'-Biazulenyl-Branched Poly (p-Terphenyl)-Piperidine (h-PTP-BiAz-1))

1 g of h-PTPE-BiAz-1 was dissolved in 30 mL of dimethyl sulfoxide (DMSO), then potassium carbonate ($K_2CO_3$, 0.39 g) and iodomethane (1 mL) were added, and the stirring reaction was performed for 24 h at room temperature in the dark. A viscous solution was obtained, ethyl acetate was added to the viscous solution for reaction, and the yellowish precipitate after reaction was filtered, washed with water for three times, and dried under vacuum in an oven at 80° C. for 24 h to obtain the h-PTP-BiAz-1.

In order to facilitate the understanding of the above synthetic process of the 6,6'-biazulenyl-branched poly(p-terphenyl)-piperidine (h-PTP-BiAz-n), the present disclosure provides a synthetic pathway diagram of the 6,6'-biazulenyl-branched poly(p-terphenyl)-piperidine (h-PTP-BiAz-n). As shown in FIG. 2, FIG. 2 is a synthetic pathway diagram of the 6,6'-biazulenyl-branched poly(p-terphenyl)-piperidine (h-PTP-BiAz-n) according to some embodiments of the present disclosure.

(3) Preparation of the Azulene-Based Branched Poly Aryl-Piperidine Anion Exchange Membrane The h-PTP-BiAz-1 (1 g) was dissolved in 30 mL of DMSO to obtain a polymer solution, and the polymer solution was filtered through a 0.45 μm polytetrafluoroethylene (PTFE) filter membrane and cast onto a clean glass plate. Subsequently, the solution was evaporated at 80° C. for 12 h, at 120° C. for 12 h, and dried under vacuum at 120° C. for 24 h to completely remove the residual solvent. The 6,6'-biazulenyl-branched poly(p-terphenyl)-piperidine I$^-$-type membrane was obtained by stripping from the glass plates. The ion exchange was carried out in 1 M potassium chloride (KCl) solution at 80° C. for 12 h, and then washed three times with deionized water to remove the residual salt to obtain 6,6'-biazulenyl-branched poly(p-terphenyl)-piperidine Cl$^-$-type membrane. The ion exchange was carried out in 1 M potassium hydroxide (KOH) solution at 80° C. for 12 h, and then washed three times with deionized water under nitrogen atmosphere to obtain 6,6'-biazulenyl-branched poly (p-terphenyl)-piperidine OH$^-$-type membrane (i.e., the azulene-based branched poly aryl-piperidine anion exchange membrane).

Example 2

Example 2 provides a method for preparing an azulene-based branched poly(p-terphenyl)-piperidine anion exchange membrane (i.e., a 6,6'-biazulenyl-branched poly (p-terphenyl)-piperidine (h-PTP-BiAz-2) anion exchange membrane), including the following steps.

The 6,6'-biazulenyl-branched poly(p-terphenyl)-piperidine (h-PTP-BiAz-2) anion exchange membrane was prepared according to the method of Example 1, with the difference being that the molar content of BiAz monomer in the percentage form was 2.

In order to verify the performance of the azulene-based branched poly aryl-piperidine anion exchange membranes prepared in Example 1 and Example 2, the azulene-based branched poly aryl-piperidine anion exchange membranes were subjected to a performance test, and the results of the test were as shown in FIGS. 3-5.

FIG. 3 is a comparison chart of the mechanical properties of the azulene-based branched poly(p-terphenyl)-piperidine anion exchange membranes prepared in Example 1 and Example 2 of the present disclosure and the poly(p-terphenyl)-piperidine anion exchange membrane prepared in Comparative Example 1 of the present disclosure. FIG. 4 is a chart illustrating the swelling rate test result of the azulene-based branched poly(p-terphenyl)-piperidine anion exchange membranes prepared in Example 1 and Example 2 of the present disclosure. FIG. 5 is a chart illustrating the anion exchange membrane electrolysis water test result for the azulene-based branched poly(p-terphenyl)-piperidine anion exchange membranes prepared in Example 1 and Example 2 of the present disclosure.

According to the test results, it is indicated that the h-PTP-BiAz-1 anion exchange membrane prepared in Example 1 exhibits an OH$^-$ conductivity of 154 mS/cm at 80° C., the ion exchange capacity (IEC) of 2.4 mmol/g, a swelling rate of 54%, a tensile strength of 55 MPa, and an elongation at break of 10%, and maintains the alkaline stability for 1000 h at 80° C. in 1 M KOH. The h-PTP-BiAz-2 anion exchange membrane prepared in Example 2 exhibits the OH$^-$ conductivity of 168 mS/cm at 80° C., the ion exchange capacity (IEC) of 2.4 mmol/g, a swelling rate of 42%, a tensile strength of 72 MPa, and an elongation at break of 13%, and maintains alkaline stability for 1000 h at 80° C. in 1 M KOH. The above data indicate that the homogeneous anion exchange membranes prepared in Example 1 and Example 2 exhibit small swelling, a suitable ionic conductivity and anion exchange capacity, and good mechanical properties. In addition, with the increase of the addition amount of the azulene-based monomer, its OH$^-$ conductivity rises, its swelling rate decreases, and its mechanical properties are enhanced.

Comparative Example 1

Comparative Example 1 provides a method for preparing a poly(p-terphenyl)-piperidine anion exchange membrane (PTP), including the following steps.

The poly(p-terphenyl)-piperidine anion exchange membrane (PTP) was prepared according to the method of Example 1, with the difference that the BiAz monomer was not added.

According the rest results, it is indicated that the poly(p-terphenyl)-piperidine anion exchange membrane prepared in Comparative Example 1 exhibits the OH$^-$ conductivity of 110 mS/cm at 80° C., the anion exchange capacity of 2.1 mmol/g, a swelling rate of 55%, a tensile strength of 42

MPa, and an elongation at break of 17%, and maintains the alkaline stability for 728 h at 80° C. in 1 M KOH.

As can be seen from FIG. 3, the azulene-based branched poly(p-terphenyl)-piperidine anion exchange membranes prepared in Example 1 and Example 2 exhibit enhanced mechanical properties relative to the poly(p-terphenyl)-piperidine anion exchange membrane prepared in Comparative Example 1.

As can be seen from FIG. 4, the azulene-based branched poly(p-terphenyl)-piperidine anion exchange membranes prepared in Example 1 and Example 2 exhibit a reduced swelling rate compared to the poly(p-terphenyl)-piperidine anion exchange membrane prepared in Comparative Example 1.

As can be seen from FIG. 5, the azulene-based branched poly(p-terphenyl)-piperidine anion exchange membranes prepared in Example 1 and Example 2 exhibit enhanced performance in the anion exchange membrane electrolytic water compared to the poly(p-terphenyl)-piperidine anion exchange membrane prepared in Comparative Example 1.

In summary, the poly(p-terphenyl)-piperidine anion exchange membrane prepared in Comparative Example 1 exhibits a significant decrease in performance when compared to the azulene-based branched poly aryl-piperidine anion exchange membranes prepared in Examples 1 and 2.

The foregoing is only a specific embodiment of the present disclosure, but the scope of protection of the present disclosure is not limited thereto, and any technician skilled in the art who can readily conceive of variations or substitutions within the scope of the technology disclosed herein shall be covered by the present disclosure. Thus, the scope of protection of the present disclosure shall be governed by the scope of protection of the stated claims.

What is claimed is:

1. An azulene-based branched poly aryl-piperidine anion exchange membrane, wherein the exchange membrane comprises an azulene-based branched poly aryl-piperidine polymer with a following structure:

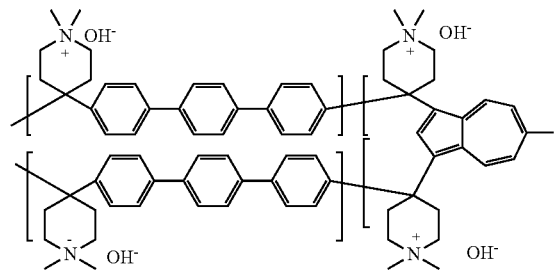

-continued

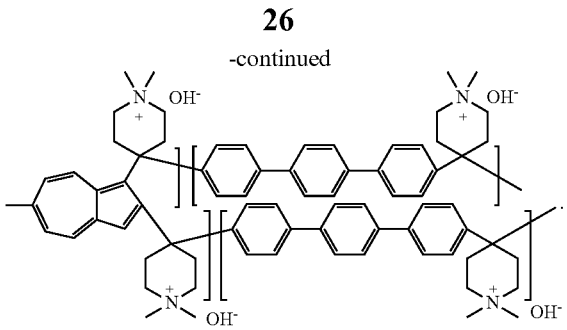

2. An electrolytic cell, comprising:
   an anode, the anode being a titanium felt loaded with IrO$_2$;
   a cathode, the cathode being a carbon paper loaded with Pt/C; and
   the azulene-based branched poly aryl-piperidine anion exchange membrane of claim 1, wherein the azulene-based branched poly aryl-piperidine anion exchange membrane is arranged between the anode and the cathode.

3. A preparation method of an azulene-based branched poly aryl-piperidine anion exchange membrane, wherein the exchange membrane comprises an azulene-based branched poly aryl-piperidine polymer with a following structure:

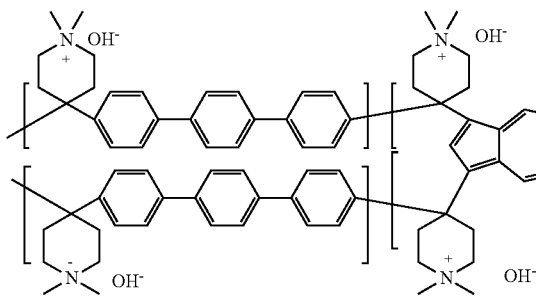 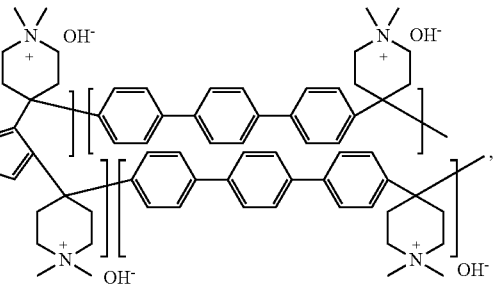

the preparation method comprises:
(a) preparing an azulene-based branched poly aryl-piperidine precursor, including:
  dissolving p-terphenyl, 6,6'-biazulenyl, and N-methyl-4-piperidone in dichloromethane, followed by adding trifluoroacetic acid and trifluoromethanesulfonic acid for reacting, and collecting the azulene-based branched poly aryl-piperidine precursor;
(b) preparing a cationic azulene-based branched poly aryl-piperidine, including:
  dissolving the azulene-based branched poly aryl-piperidine precursor in dimethyl sulfoxide (DMSO), adding potassium carbonate and iodomethane, reacting in the dark followed by an addition of ethyl acetate and precipitation, and collecting the cationic azulene-based branched poly aryl-piperidine;
(c) preparing the azulene-based branched poly aryl-piperidine anion exchange membrane, including:
  dissolving the cationic azulene-based branched poly aryl-piperidine in DMSO, collecting a Cl$^-$-type membrane, performing an ion exchange on the Cl$^-$-type membrane to obtain an OH$^-$-type membrane, purifying the OH$^-$-type membrane, and collecting the azulene-based branched poly aryl-piperidine anion exchange membrane.

4. The preparation method of claim 3, wherein an OH⁻ conductivity of an azulene-based branched poly(p-terphenyl)-piperidine anion exchange membrane is at least 150 mS/cm at 80° C.

5. An electrolytic cell, comprising:
- an anode, the anode being a titanium felt loaded with $IrO_2$;
- a cathode, the cathode being a carbon paper loaded with Pt/C; and
- an azulene-based branched poly aryl-piperidine anion exchange membrane prepared by the preparation method of claim 3, wherein the azulene-based branched poly aryl-piperidine anion exchange membrane is arranged between the anode and the cathode.

\* \* \* \* \*